United States Patent
Kunz et al.

(10) Patent No.: US 10,993,282 B2
(45) Date of Patent: Apr. 27, 2021

(54) METHOD AND APPARATUS FOR SHORT CODE DIALING FOR RESTRICTED SERVICES FOR UNAUTHENTICATED USER EQUIPMENT

(71) Applicant: Lenovo (Singapore) Pte. Ltd., New Tech Park (SG)

(72) Inventors: Andreas Kunz, Ladenburg (DE); Genadi Velev, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 52 days.

(21) Appl. No.: 16/058,419

(22) Filed: Aug. 8, 2018

(65) Prior Publication Data

US 2019/0053328 A1     Feb. 14, 2019

Related U.S. Application Data

(60) Provisional application No. 62/543,180, filed on Aug. 9, 2017.

(51) Int. Cl.
*H04W 4/00*      (2018.01)
*H04W 80/10*     (2009.01)
(Continued)

(52) U.S. Cl.
CPC .......... *H04W 80/10* (2013.01); *H04L 65/105* (2013.01); *H04L 65/1006* (2013.01);
(Continued)

(58) Field of Classification Search
CPC ............... H04W 72/042; H04W 76/27; H04W 72/0446; H04W 5/0053; H04W 80/10; H04W 12/0023; H04W 4/16; H04W 12/04; H04W 12/00514; H04W 12/02;
(Continued)

(56) References Cited

U.S. PATENT DOCUMENTS

| | | | |
|---|---|---|---|
| 2004/0008666 A1* | 1/2004 | Hardjono | H04L 63/0823 370/352 |
| 2004/0153667 A1* | 8/2004 | Kastelewicz | H04W 12/06 726/9 |

(Continued)

OTHER PUBLICATIONS

Schumann, PCT International Search Report, International application No. PCT/IB2018/001041, European Patent Office, Rijswijk, NL, Jan. 4, 2019.

(Continued)

*Primary Examiner* — Atique Ahmed
(74) *Attorney, Agent, or Firm* — Loppnow & Chapa; Matthew C. Loppnow (57) ABSTRACT

A method and apparatus provide for attachment for restricted local operator services for an apparatus, such as a user equipment. An attach procedure for the restricted local operator services for the apparatus can be performed. A proxy call session control function address for the restricted local operator services can be received during the attach procedure. A session initiation protocol register request message can be generated. The session initiation protocol register request message can include an indication for the restricted local operator services and can include an internet protocol multimedia public user identification based on an identification of the apparatus. The session initiation protocol register request message to the proxy call session control function address can be sent, the session initiation protocol register request message can include the indication for the restricted local operator services.

16 Claims, 7 Drawing Sheets

(51) Int. Cl.
  *H04L 29/06* (2006.01)
  *H04W 4/16* (2009.01)
  *H04W 12/00* (2021.01)
  *H04W 12/04* (2021.01)
  *H04W 12/02* (2009.01)
  *H04L 9/30* (2006.01)

(52) U.S. Cl.
  CPC ...... H04L 65/1016 (2013.01); H04L 65/1033 (2013.01); H04L 65/1069 (2013.01); H04L 65/1073 (2013.01); H04W 4/16 (2013.01); H04W 12/0023 (2019.01); H04W 12/04 (2013.01); *H04L 9/30* (2013.01); *H04W 12/00514* (2019.01); *H04W 12/02* (2013.01)

(58) Field of Classification Search
  CPC ... H04L 5/0053; H04L 5/0007; H04L 5/0048; H04L 1/1812; H04L 65/1006; H04L 65/1016; H04L 65/1033; H04L 65/105; H04L 65/1073; H04L 65/1069; H04L 9/30
  See application file for complete search history.

(56) References Cited

U.S. PATENT DOCUMENTS

| | | | |
|---|---|---|---|
| 2007/0060097 A1* | 3/2007 | Edge | H04W 8/205 455/404.1 |
| 2007/0174443 A1 | 7/2007 | Shaheen et al. | |
| 2008/0039086 A1* | 2/2008 | Gallagher | H04W 12/08 455/435.1 |
| 2009/0156213 A1* | 6/2009 | Spinelli | H04W 76/12 455/436 |
| 2011/0010768 A1* | 1/2011 | Barriga | H04L 63/0428 726/11 |
| 2011/0188411 A1* | 8/2011 | Faccin | H04W 76/10 370/259 |
| 2014/0376414 A1* | 12/2014 | Edge | G08B 25/10 370/259 |
| 2015/0124588 A1 | 5/2015 | Hallenstal et al. | |
| 2018/0234469 A1* | 8/2018 | Kim | H04L 65/105 |
| 2018/0310162 A1* | 10/2018 | Kim | H04W 8/04 |

OTHER PUBLICATIONS

Secretary TSG SA, Maurice Pope et al: 1-14 "Draft Report of TSG SA meeting #76", 3GPP Draft; Report SA 76 Draft V000, 3rd Generation Partnership Project (3GPP), Mobile Competence Centre ; 650, Route Des Lucioles , F-06921 Sophia-Antipolis Cedex , France, vol. TSG SA, No. West Palm Beach, Florida, USA; Jun. 7, 2017-Jun. 9, 2017, Jun. 8, 2017.

TSG SA WG1: "New WID on proposal for Provision of Access to Restricted Local Operator Services by Unauthenticated UEs". 3GPP Draft; SP-170449, 3rd Generation Partnership Project (3GPP), Mobile Competence Centre; 650, Route Des Lucioles; F-06921 Sophia-Antipolis Cedex ; France vol. TSG SA, No. West Palm Beach , FL; Jun. 7, 2017-Jun. 9, 2017, Jun. 6, 2017.

* cited by examiner

METHOD AND APPARATUS FOR SHORT CODE DIALING FOR RESTRICTED SERVICES FOR UNAUTHENTICATED USER EQUIPMENT

BACKGROUND

1. Field

The present disclosure is directed to a method and apparatus for signaling on a wireless network. More particularly, the present disclosure is directed to a method and apparatus for short code dialing for restricted services for unauthenticated user equipment.

2. Introduction

Presently, wireless communication devices, such as user equipment (UE), communicate with other communication devices using wireless signals. In 3rd Generation Partnership Project (3GPP) a study item in document SP-170382 "New SID: Study on System enhancements for Provision of Access to Restricted Local Operator Services by Unauthenticated UEs (PARLOS)" was agreed. This study aims to fulfil the 3GPP SA1 requirements to provide UEs with network access to restricted local operator services even if they are not successfully authenticated. The ability to provide access to such local services has been available to U.S. operators, but only on a proprietary basis.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for signaling of system information. According to a possible embodiment, a session initiation protocol register request message can be received from an apparatus. The session initiation protocol register request message can include an indication for restricted local operator services. A detection can be made that the session initiation protocol register request message is for restricted local operator services service based on the restricted local operator services indication. The session initiation protocol register request message can be forwarded to a serving call session control function in response to the detecting that the session initiation protocol register request message is for restricted local operator services service. A response message indicating the apparatus is registered with restricted local operator services of an internet protocol multimedia core network subsystem can be sent to the apparatus.

According to another possible embodiment, an Attach procedure for restricted local operator services for a user equipment can be performed. A proxy call session control function address for restricted local operator services can be received during the Attach procedure. Session initiation protocol register request message, the session initiation protocol register request message including an indication for restricted local operator services and the session initiation protocol register request message includes an internet protocol multimedia public user identification can be generated based on an identification of the apparatus. The session initiation protocol register request message to can be sent the proxy call session control function address. The session initiation protocol register request message can include the indication for restricted local operator services. A response message indicating the apparatus is registered with restricted local operator services of an internet protocol multimedia core network subsystem can be received.

Figure 1:
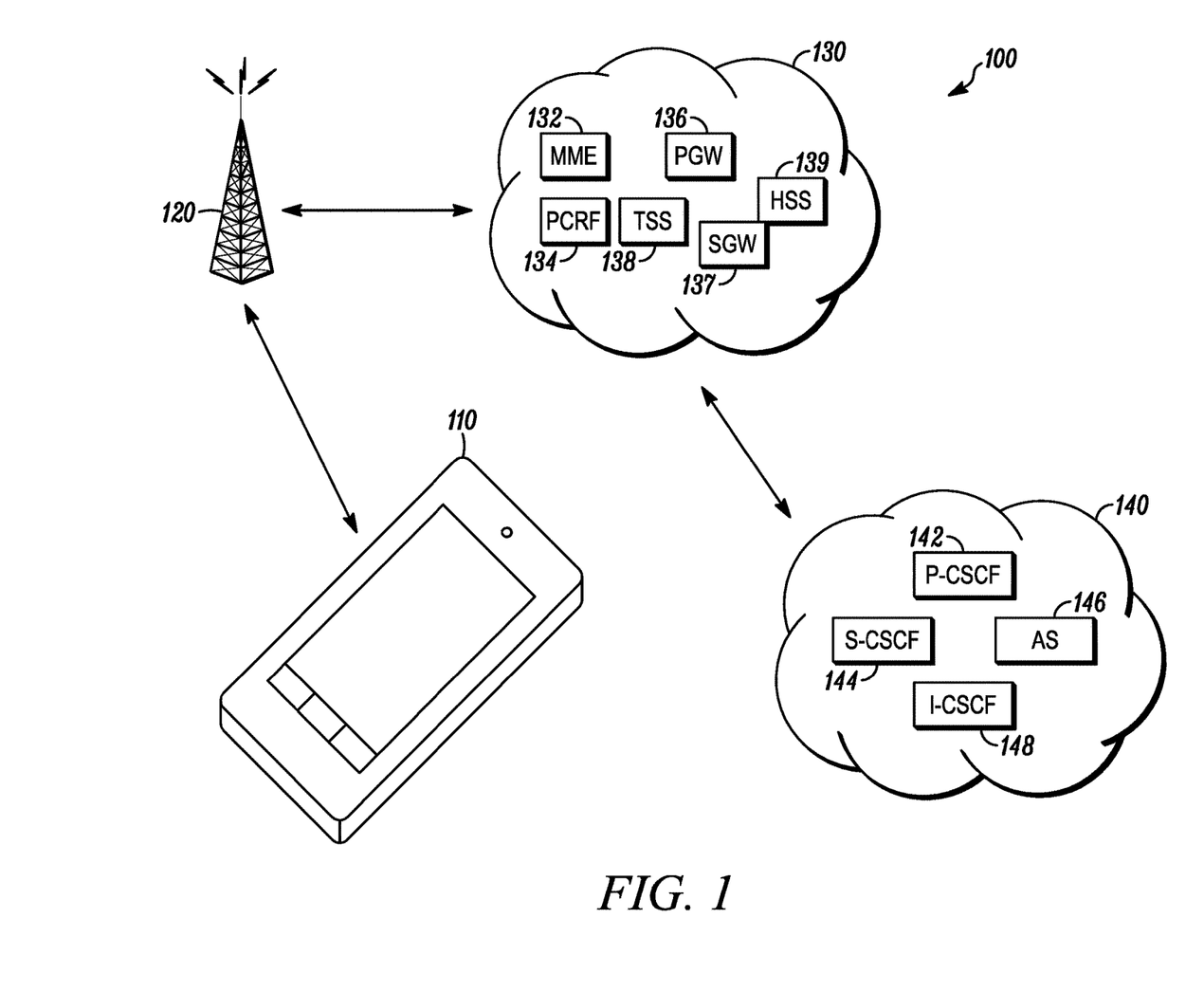
FIG. 1 is a block diagram of an example system, according to a possible embodiment.

FIG. 1 is an example block diagram of a system 100, according to a possible embodiment. The system 100 can include a UE 110, at least one network entity 120, such as a base station, a network 130, and an Internet Protocol (IP) Multimedia Core Network Subsystem (IMS) 140. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The network entity 120 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), and/or can be any other network entity that can provide wireless access between a UE and the network 130.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In operation, the UE 110 can communicate with the network 130 via the network entity 120. For example, the UE 110 can send and receive control signals described herein on a control channel and user data signals described herein on a data channel via a message(s) communicated between the UE 110 and the network entity 120. The network 130 can include various NEs, such as a Mobility Management Entity (MME) 132, a Policy and Charging Rules Function (PCRF) 134, a Packet Data Network Gateway (PGW) 136, a Temporary Subscriber Server (TSS) 138, and a Home Subscriber Server (HSS) 139. The network 130 can communicate with the IMS 140. The IMS 140 can include various elements, such as the P-CSCF 142, a Serving Call Session Control Function (S-CSCF) 144, at least one Application Server (AS) 146, and an Interrogating Call Session Control Function (I-CSCF) 148.

In the following embodiments, the term eNB/gNB can be used for a base station but the base station can be replaced by any other radio access node (RAN), such as an Access Point (AP), a New Radio (NR) node, etc. Further, the proposed system 100 and methods described below can be applied to other types of networks including IEEE 802.11 variants, Global System for Mobile communication (GSM), General Packet Radio Services (GPRS), Universal Mobile Telecommunications Service (UMTS), LTE variants, Code Division Multiple Access (CDMA)2000, Bluetooth, ZigBee, Sigfoxx, etc. The described embodiments can also be applicable to Next Generation Mobile Networks, see 3GPP TS 23.501 and 3GPP TS 23.502, where for example the MME 132 can map to Access and Mobility Management Function (AMF), and can partially map to AMF for terminating Non Access Stratum (NAS) Sparse Mode (SM) protocol, Session Management Function (SMF)/User Plane Function (UPF) can map to a Serving Gateway (SGW) 137/PGW 137, and a Home Subscriber Server (HSS) 139 can map to a Unified Data Management (UDM)/User Data Repository (UDR). The new logical functional entity TSS 138 may be standalone or can be collocated with the MME 132, a Home Subscriber Server (HSS) or an Authentication, Authorization, and Accounting (AAA) server, or even the AMF, SMF, UDM, UDR, or any other involved node in the network 130. In the following embodiments, the UE 110 can refer to a mobile device, but it can also be a Mobile Station (MS) without a Universal Mobile Telecommunications SIM (USIM) or USIM/Subscriber Identify Module (SIM) or a Mobile Equipment (ME). The UE 110, MS, or ME, can be assumed to be preconfigured with a public and private key pair or can be capable of generating them based on an internal logic, when required. The system 100 can allow an unauthenticated UE 110 to access restricted local operator services based on operator policy and regional regulatory requirements. The system 100 can identify an origination to restricted local operator services, such as dialed digits and captive portal. The system 100 can determine that the RLOS is available. The system 100 can allow access to restricted operator services by the unauthenticated UE 110. The system 100 can charge for information collection. The system 100 can account for security considerations. The wide deployment of LTE and corresponding introduction of Voice Over LTE (VoLTE) can use a standardized mechanism to allow the UE 110 to access these services, such as dialing a particular digit string and accessing a captive portal, without necessarily being successfully authenticated for access. The embodiments disclosed herein can fulfill the 3GPP requirements for security during the UE 110 accessing the network 130 to the RLOS even if the UE 110 is not successfully authenticated.

The system 100 provides a solution where the UE 110 is also dialing a short code number and gets connected to an audio service/help desk/application server. Since this is limited to LTE and VoLTE, it is assumed that the IMS 140 can be used for delivering the voice session. This is difficult since the IMS 140 is designed for authenticated services of the network operator and executes those services in the home network, such as the S-CSCF 144 that can be located in a Home Public Land Mobile Network (HPLMN). The system 100 can account for a completely new connection of a delivery session for the IMS 140.

The IMS 140 can conform with several 3GPP releases in Technical Specification (TS) 23.228 and with several other additional services or interactions with the network 130 which can conform to Technical Specification (TS) 23.401. Current IMS platforms do not allow an unregistered user to access the operator's IMS services. There are some exceptions to such restrictions, such as for an emergency call or mobile termination session delivery to unregistered users, but not for a mobile origination case. In case of a Subscriber Identify Module (SIM)-less emergency call and Universal Mobile Telecommunications SIM (USIM)-less emergency call there is no encryption setup on the data bearer and no IMS encryption in place. PARLOS encryption on the IMS layer can be beneficial in order to protect the data associated with the UE 110.

The system 100 can provide IMS service to the unauthenticated UE 110, such as when the UE 110 can be authenticated via a subscription repository like Home Subscriber Server (HSS) and can provide security in protocol layers of the IMS. The UE 110 can perform an Attach procedure for RLOS before an event, such as when the UE 110 is RLOS attached and has IP connectivity to a RLOS service. During the Attach procedure the UE 110 can receive an address of the P-CSCF 142 for RLOS. If the MME 132 provisions the TSS 138 with specific information for the UE 110, then the MME 132 can configure the TSS 138 with information the TSS 138 exchanged or assigned to the UE 110 during the Attach procedure. This information may contain some security context which can be reused in the following embodiments for securing Session Initiation Protocol (SIP) signaling. The PARLOS can be specified for Evolved Universal Terrestrial Radio Access (E-UTRA)/LTE, or any future access technology, such as New Radio. The embodiments can assume that the UE 110 is not performing cell reselection to another Radio Access Technology (RAT) of the PARLOS PLMN, such as 2nd Generation 2G or 3G wireless, and cannot signal Single Radio Voice Call Continuity (SRVCC) capabilities to the network entity 120. If the network 130 assigns any Quality of Service (QoS) Class Identifier (QCI), such as QCI=1 or QCI=2, bearers to the RLOS IMS media bearers, the network 130 can assure that the UE 110 is not triggering SRVCC by accidentally sending its SRVCC capabilities to the network entity 120.

Figure 2:
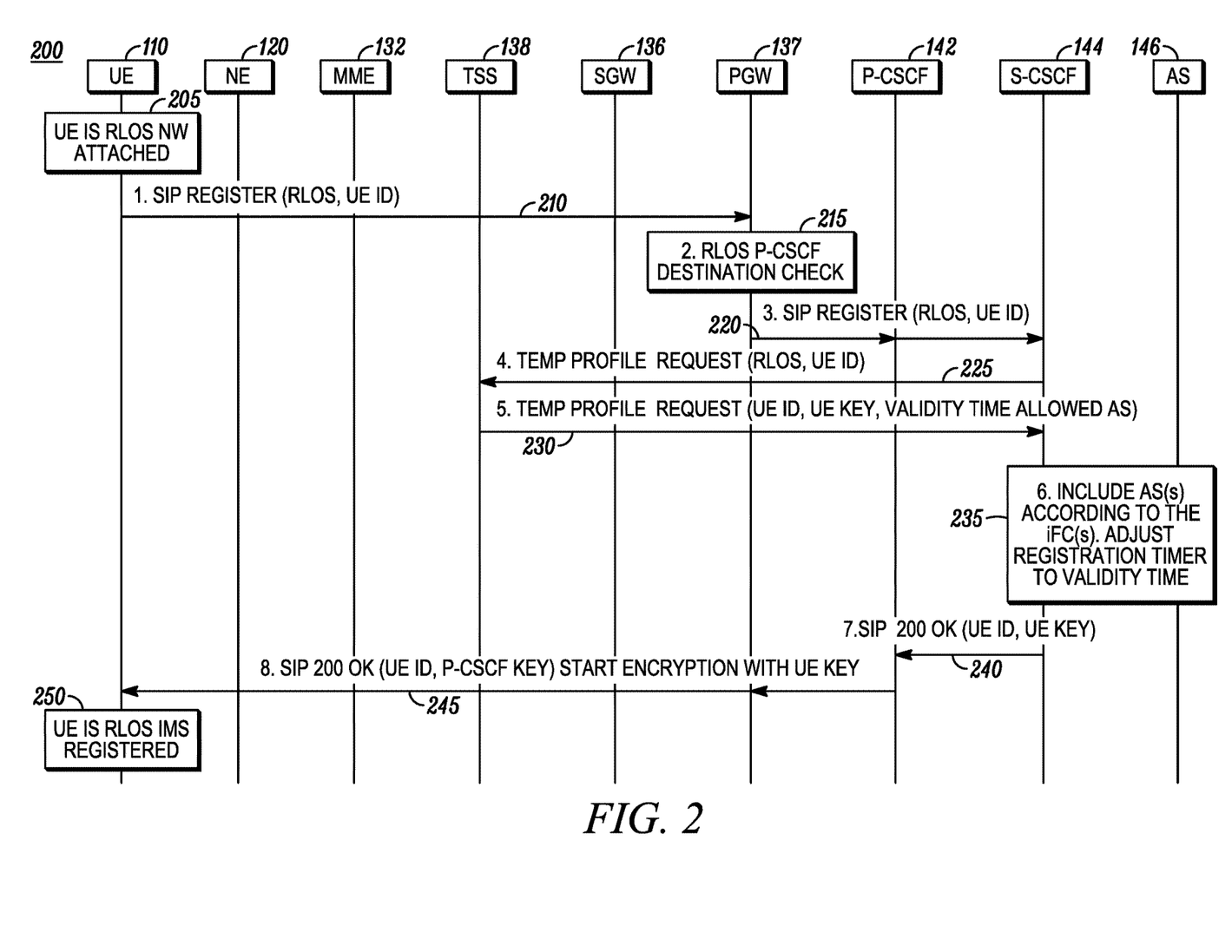
FIG. 2 is an example signal flow diagram of the example system of FIG. 1, according to a possible embodiment.

An embodiment can include IMS registration for RLOS and an IMS session setup procedure for RLOS. FIG. 2 is an example signal flow diagram 200 of the example system of FIG. 1. The signal flow diagram 200 can make the assumptions mentioned above as prerequisite, that is at 205 that the UE 110 can be RLOS network attached. The P-CSCF 142 may be dedicated for RLOS and may be selected by the PGW 136 based on an indication from the MME 132 or a rule from the PCRF 134 and provided to the UE 110 during the Attach procedure.

At 210 and 215, the UE 110 can send a SIP REGISTER request message towards the P-CSCF 142. The PGW 136 can perform gating and authorization of a destination address for the P-CSCF 142. An IP Multimedia Public User Identification (IMPU) for the UE 110 can be used in the SIP REGISTER request message that includes an identification of the UE 110 generated or received during the Attach procedure, and, if not suitable for the IMS 140, can be combined with the network domain derived from the address of the P-CSCF 142 for RLOS, received during the Attach procedure. The UE 110 may include its Public Key as well in the SIP REGISTER request message to the P-CSCF 142, but it can be further assumed that security context of the UE 110 is stored in the TSS 138 already.

At 220, the PGW 136 can forward the SIP REGISTER request message to the P-CSCF 142, which may be dedicated for RLOS. The P-CSCF 142 can forward the SIP REGISTER request message to the S-CSCF 144, which may be dedicated for RLOS as well. The P-CSCF 142, the I-CSCF 148, and the S-CSCF 144 may be collocated for RLOS.

At 225, the S-CSCF 144 can detects an RLOS registration procedure and can withhold contacting the HSS 139 of the PLMN, instead the S-CSCF 144 queries the TSS 138 with the identification of the UE 110 that can be provided in the SIP REGISTER request message. This identification of the UE 110 may be configured by the MME 132 during Attach procedure.

At 230, the TSS 138 can provide a RLOS subscriber profile to the S-CSCF 144 including the initial Filter Criteria(s) (iFC(s)) on which the AS(s)) can be triggered. The TSS 138 may send a validity time for which the UE 110 can be eligible to keep an IMS registration. The validity time could be interpreted in several ways, it could be a maximum time registration with the IMS 140 can be valid and can be renewed, or it could describe an exact time when no more registration is possible at all, such as ongoing registration with the IMS 140 that can be terminated at this time and further attempts can be rejected if IP connectivity is still available to reach the P-CSCF 142. A Subscription profile from the TSS 138 may contain security information which can be used to start ciphering of signaling with the IMS 140.

At 235, the S-CSCF 144 can perform service control and can include the relevant AS(s) from the iFC(s) in the path. Depending on the availability of the validity time and its usage, the S-CSCF 144 or at least one AS 146 can adjust the timer for the registration to the validity time received from the TSS 138, or a trigger when to initiate de-registration with the IMS 140.

At 240, the S-CSCF 144 provides the key, such as a Public Key, for the UE 110 from the security information to the P-CSCF 142 in a 200 OK response. In a scenario in which the TSS 138 can store a symmetric key which can be exchanged during the Attach procedure, then the key can be withheld from being sent to the UE 110 at 240. A generated input parameter for the symmetric encryption may be sent to the UE 110 instead.

At 245, the P-CSCF 142 can start ciphering with a key, such as a Public Key for the UE 110 and can provide a key, such as a Public key for the P-CSCF 142 to the UE 110 in the 200 OK response. In a scenario in which a symmetric key can be received from the TSS 138, then a security key, such as a Public Key, for the P-CSCF 142 is withheld from being provided. At 250, the UE 110 can now be registered with the IMS 140 for RLOS with SIP encryption enabled.

Figure 3:
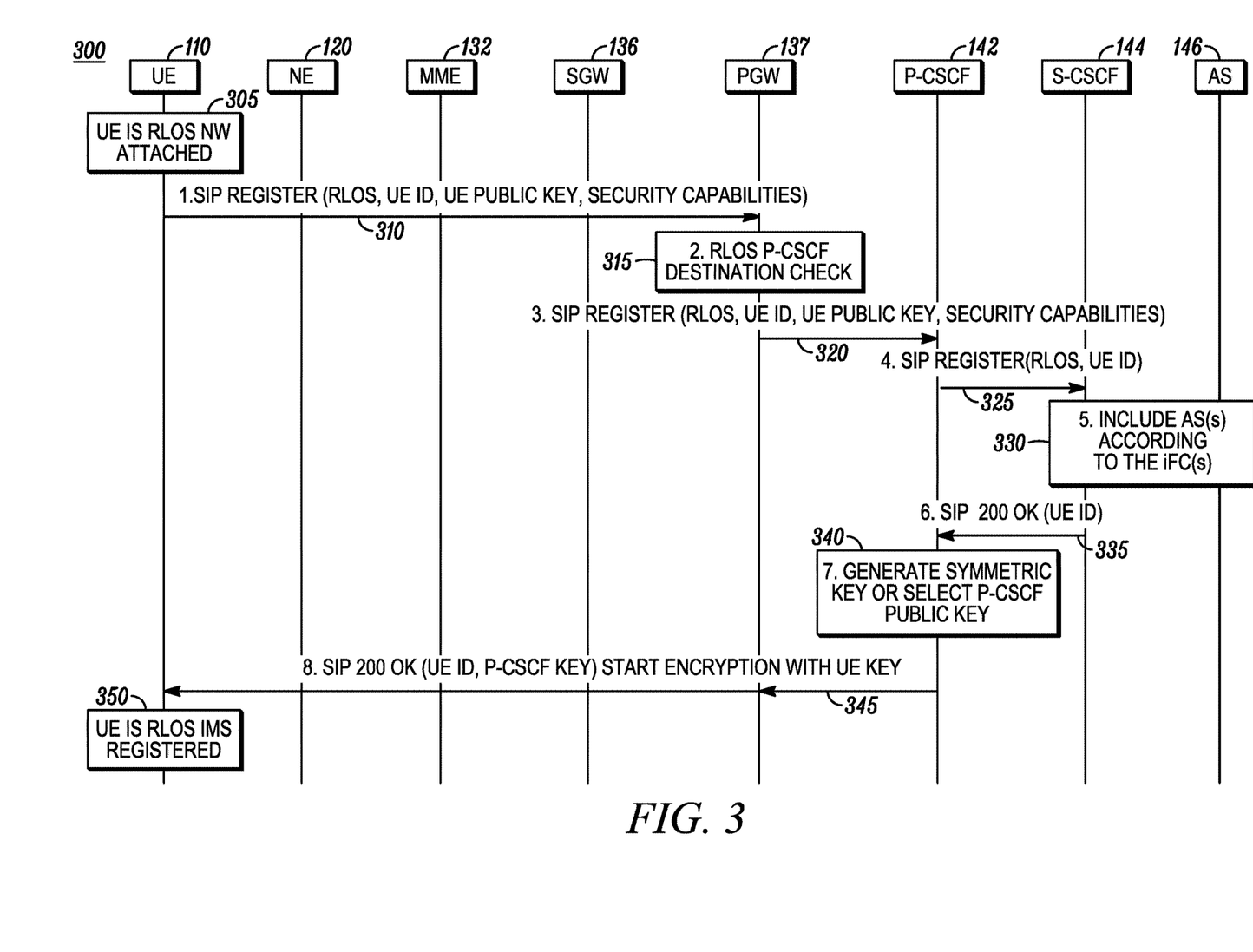
FIG. 3 is another example signal flow diagram of the example system of FIG. 1, according to a possible embodiment.

In another embodiment, the TSS 138 can be withheld from being used for querying the security information and the service profile. FIG. 3 is another example signal flow diagram 300 of the example system of FIG. 1. The signal flow diagram 300 can make the assumptions mentioned above as prerequisite, that is at 305 that the UE 110 can be RLOS network attached. The P-CSCF 142 may be dedicated for RLOS and may be selected by the PGW 136 based on an indication from the MME 132 or a rule from the PCRF 134 and provided to the UE 110 during the Attach procedure. At 310 and 315, the UE 110 can send a SIP REGISTER request message towards the P-CSCF 142. The PGW 136 can perform gating and authorization of the destination address for the P-CSCF 142. The IMPU for the UE 110 can be used in the SIP REGISTER request message includes an ID of the UE 110 that can be generated or received during the Attach procedure, and, if not suitable for IMS, can be combined with the network domain derived from the address of the P-CSCF 142 for RLOS, received during the Attach procedure. The UE 110 may include its Public Key as well in the SIP REGISTER request message to the P-CSCF 142 as well as security capabilities for the UE 110.

At 320, the PGW 136 can forward the SIP REGISTER request message to the P-CSCF 142, which may be dedicated for RLOS. The P-CSCF 142 stores a Public Key for the UE 110 and the security capabilities, if available.

At 325, the P-CSCF 142 can forward the SIP REGISTER request message to the S-CSCF 144, which may be dedicated for RLOS as well. The P-CSCF 142, the I-CSCF 148, and the S-CSCF 144 may be collocated for RLOS.

At 330, the S-CSCF 144 can detect an RLOS registration procedure and can withhold contacting the HSS 139 of the PLMN. The S-CSCF 144 may have a preconfigured RLOS subscriber profile including the iFC(s) on which the AS 146 to be triggered. The S-CSCF 144 can perform service control and can include relevant AS(s) 146 from the iFC(s) in the path. The AS 146 may have information about a validity time for which the UE 110 is eligible to keep an IMS registration. The validity time could be interpreted in several ways. For example, the validity time could be a maximum time the IMS registration as such is valid and can be renewed or could describe an exact time when no more registration is possible, such as when ongoing registration with the IMS 140 that can be terminated at this time and further attempts can be rejected if IP connectivity is still available to reach the P-CSCF 142.

At 335, the S-CSCF 144 can send a SIP 200 OK response to the P-CSCF 142 and the UE 110 is now registered for RLOS with the IMS 140. At 340, the P-CSCF 142 may select a Public Key for the P-CSCF 142 or may generate a symmetric key based on security capabilities of the UE 110. At 345, the P-CSCF can start ciphering with a security key, such as a Public Key, for the UE 110 and can provide a security key, such as a Public Key, for the P-CSCF 142 to the UE 110 in the 200 OK response. In a scenario in which a symmetric key is generated, the UE 110 can use the symmetric key for encryption of further SIP signaling, otherwise the UE 110 can use the Public Key for the P-CSCF 142 for encryption. At 350, the UE 110 can now be registered with the IMS 140 for RLOS with SIP encryption enabled.

In another embodiment, only the Public Key of the P-CSCF 142 can be returned to the UE 110 in the 200 OK response at 345. The UE 110 or the IMS 140 could then initiate a SIP request to trigger generation of a symmetric key, which can replace 340, in the other entity which can get provisioned in the acknowledgement, or as another variant can provide a symmetric key to the other entity which then can get acknowledged. The SIP message of the request could be of any format, such as INVITE, OPTIONS, NOTIFY, SUBSCRIBE, MESSAGE, OK etc., and could be combined with a subsequent request of either the UE 110 or the IMS 140.

Figure 4:
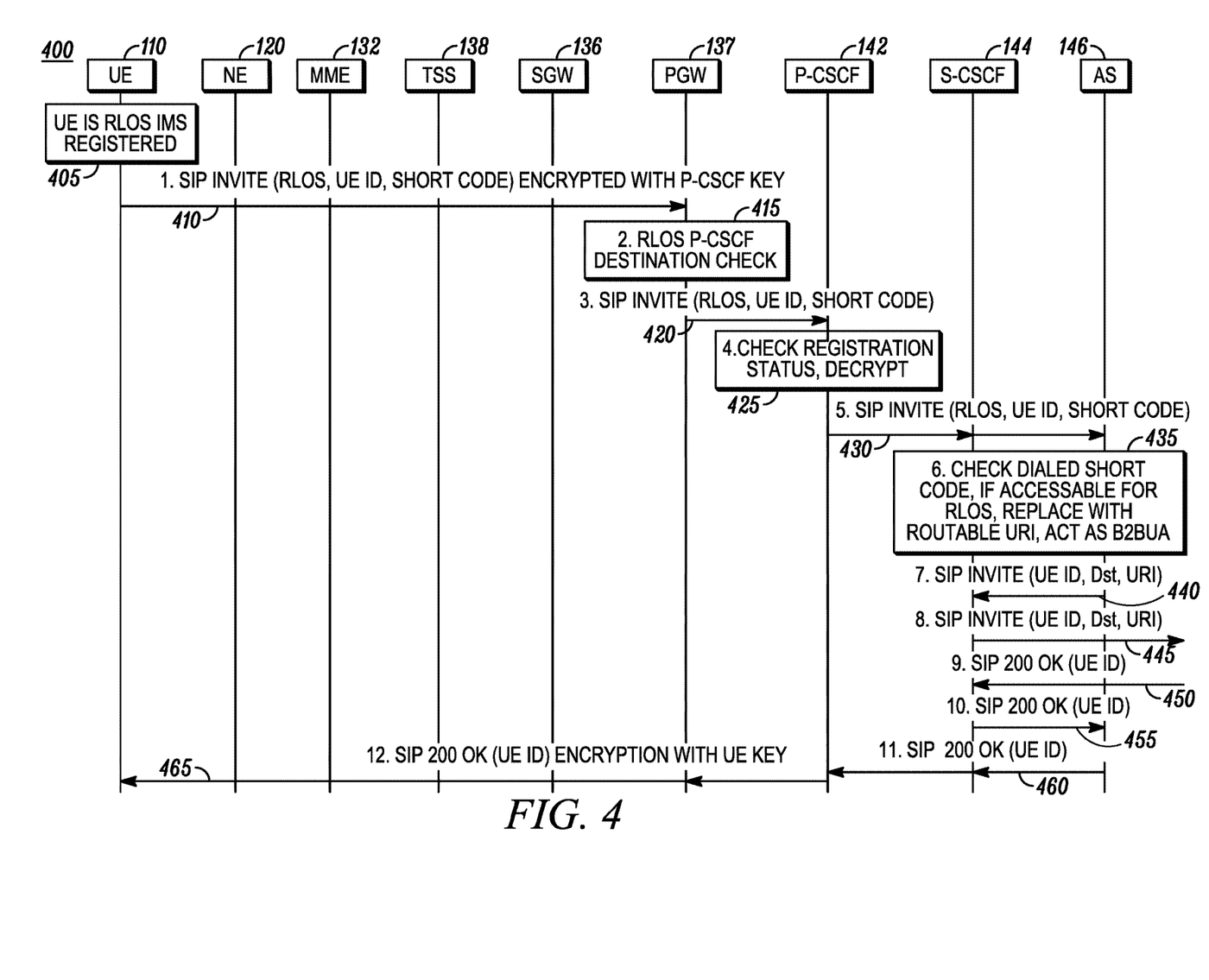
FIG. 4 is an example signal flow diagram for session setup for Restricted Local Operator Services by Unauthenticated UEs (RLOS), according to a possible embodiment.

FIG. 4 is an example signal flow diagram 400 for session setup for RLOS, according to a possible embodiment. The signal flow diagram 400 can make the assumptions mentioned above as prerequisite, that is at 405 that the UE 110 can be RLOS network attached. The P-CSCF 142 may be dedicated for RLOS and may be selected by the PGW 136 based on an indication from the MME 132 or a rule from the PCRF 134 and provided to the UE 110 during the Attach procedure. At 410 and 415, the UE 110 can send a SIP INVITE request towards the P-CSCF 142. The UE 110 may indicate RLOS, the ID of the UE 110 and the short code (local number, non-international format) in the SIP INVITE request, such as a Uniform Resource Identifier (URI). The message may be encrypted with a Public Key of the P-CSCF 142 or a symmetric key. The PGW 136 can perform gating and authorization of destination address of the P-CSCF 142.

At 420, the PGW 136 can forward the SIP INVITE request to the P-CSCF 142, which may be dedicated for RLOS. At 425, the P-CSCF 142 can decipher the message and checks the RLOS registration status for an ID of the UE 110. At 430, the P-CSCF 142 can forward the SIP INVITE request to the S-CSCF 144, which may be dedicated for RLOS as well. The P-CSCF 142, the I-CSCF 148 and the S-CSCF 144 may be collocated for RLOS. The S-CSCF 144 can detect a session setup request and can forward the session setup request to an appropriate AS 146, configured with the iFC(s).

At 435, the AS 146 can check whether the short code is allowed for RLOS and can replace the short code with a routable, such as an international format, request URI. The AS 146 can act as Back to Back User Agent (B2BUA). At 440, the AS 146 can send the SIP INVITE request with the destination URI to the S-CSCF 144. At 445, the S-CSCF 144 can forward the SIP INVITE request to a remote end, such as another AS 146 or a remote UE 110.

At 450, the remote end can acknowledge the SIP INVITE request with a 200 OK response towards the S-CSCF 144. At 455, the S-CSCF 144 can forward the 200 OK response to the AS 146. At 460, the AS 146 can acknowledge the SIP INVITE request from the UE 110 and sends a 200 OK response to the P-CSCF 142. At 465, the P-CSCF 142 can encrypt the SIP INVITE request and can forward the 200 OK response to the UE 110.

Thus in at least one embodiment that utilizes the TSS 138, the UE 110 can compose its IMPU based on the ID of the UE 110 used in the Attach procedure, such as either an ID generated by the UE 110 or received during an Attach Accept message, and, if not already suitable for IMS, can be combined with the network domain derived from the address of the P-CSCF 142 for RLOS, received during the Attach procedure. The TSS 138 can store security context of the UE 110, including a validity time, which indicates a final end of service provided by the IMS 140. This information is generated/exchanged during the Attach procedure. Provisioning of the Public Key of the UE 110 and RLOS indication to the P-CSCF 142 can be in the SIP REGISTER request message. Such provisioning includes derivation of security material, such as Public Keys or symmetric keys, for encryption of SIP messages between UE 110 and P-CSCF 142. RLOS Registration can be detected in the S-CSCF 144 based on RLOS indication in the SIP REGISTER request message, with a different procedure being performed for key exchange without use of the IMS 140. The S-CSCF 144 can perform selection of the TSS 138 based on RLOS indication in the SIP REGISTER request message. The UE key, Public or symmetric key, can be provisioned from the TSS 138 to the P-CSCF 142 via the S-CSCF 144. The P-CSCF Public Key or an input parameter for symmetric encryption can be provisioned to the UE 110 from the P-CSCF 142 in the SIP 200 OK response.

In at least one embodiment that does not rely on the TSS 138 includes key exchange between the UE 110 and the P-CSCF 142 with the possibility to create a symmetric key in the P-CSCF 142 for further SIP signaling encryption. The UE 110 can provide RLOS indication, such as a Public Key for the UE 110, and security capabilities to the P-CSCF 142 in the SIP REGISTER request message. The S-CSCF 144 can be withheld from querying any database and can be preconfigured for RLOS with the service profile. The P-CSCF 142 can generate a symmetric key and/or can select a Public Key for the P-CSCF 142. The P-CSCF 142 can provide the symmetric key or the Public Key of the P-CSCF 142 to the UE 110 in the 200 OK response of the registration.

It should be understood that, notwithstanding the particular procedures as shown in the figures, a variety of additional or different procedures can be performed depending upon the embodiment, and one or more of the particular procedures can be rearranged, repeated or eliminated entirely depending upon the embodiment. Also, some of the procedures performed can be repeated on an ongoing or continuous basis simultaneously while other procedures are performed. Furthermore, different procedures can be performed by different elements or in a single element of the disclosed embodiments.

Figure 5:
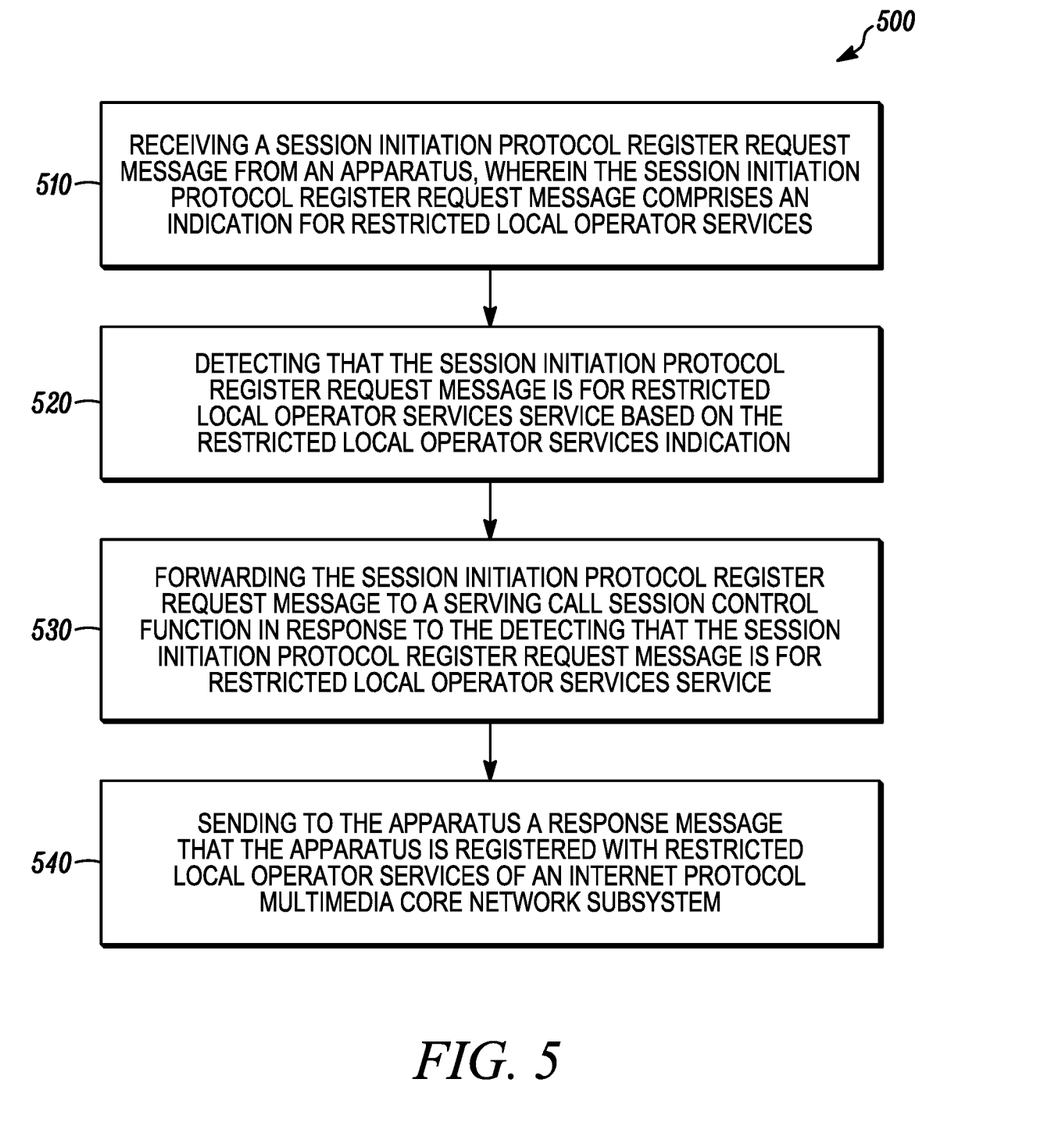
FIG. 5 is an example flowchart illustrating operation of an apparatus, such as a Proxy Call Session Control Function (P-CSCF), according to a possible embodiment.

FIG. 5 is an example flowchart 500 illustrating operation of an apparatus, such as the P-CSCF 142, according to a possible embodiment. According to a possible embodiment, the flowchart 500 can be performed by the P-CSCF 142 and the referenced apparatus can be the UE 110. At 510, the SIP REGISTER request message from an apparatus can be received. The SIP REGISTER request message includes an indication for the RLOS. According to a possible embodiment, the SIP REGISTER request message can include security material, such as the Public Key associated with the apparatus. According to a possible embodiment, the SIP REGISTER request message can include the IMPU. According to a possible embodiment, the IMPU can include an ID associated with the apparatus and one of generated and received during an Attach procedure. According to a possible embodiment, if the IMPU is not suitable for the IMS 140 the IMPU can be combined with a network domain derived from an address associated with the P-CSCF 142 for the RLOS and received during the Attach procedure.

At 520, the SIP REGISTER request message for the RLOS can be detected based on the RLOS indication. At 540, a response message that the apparatus is registered with the RLOS of the IMS 140 can be sent.

According to a possible embodiment, the forwarding in 530 can further include the S-CSCF 144 can be selected based on the RLOS indication and can be in response to the detecting that the SIP REGISTER request message is for the RLOS. According to a possible embodiment, a Public Key can be generated, wherein the response message that the apparatus is registered with RLOS of the IMS 140 includes the generated Public Key. According to a possible embodiment, service control for the registration of the RLOS of the IMS 140 can be performed. The service control can include at least one of adjusting a timer for the RLOS registration to a validity time and triggering when to initiate de-registration of the IMS 140. According to a possible embodiment, an IMS session can be established including the RLOS indication in a SIP INVITE request message.

According to a possible embodiment, a SIP INVITE request message can be sent to the network entity 120 based on an acceptance of the SIP REGISTER request message. According to a possible embodiment, the flowchart 500 can further include generating a Public Key for the apparatus and including the Public Key in the SIP REGISTER request message. According to a possible embodiment, the identification of the apparatus includes at least one of an identification of the equipment of the apparatus associated with an Attach procedure for the apparatus and the IMPU. According to a possible embodiment, a validity time is associated with the registered the RLOS of the IMS 140.

Figure 6:
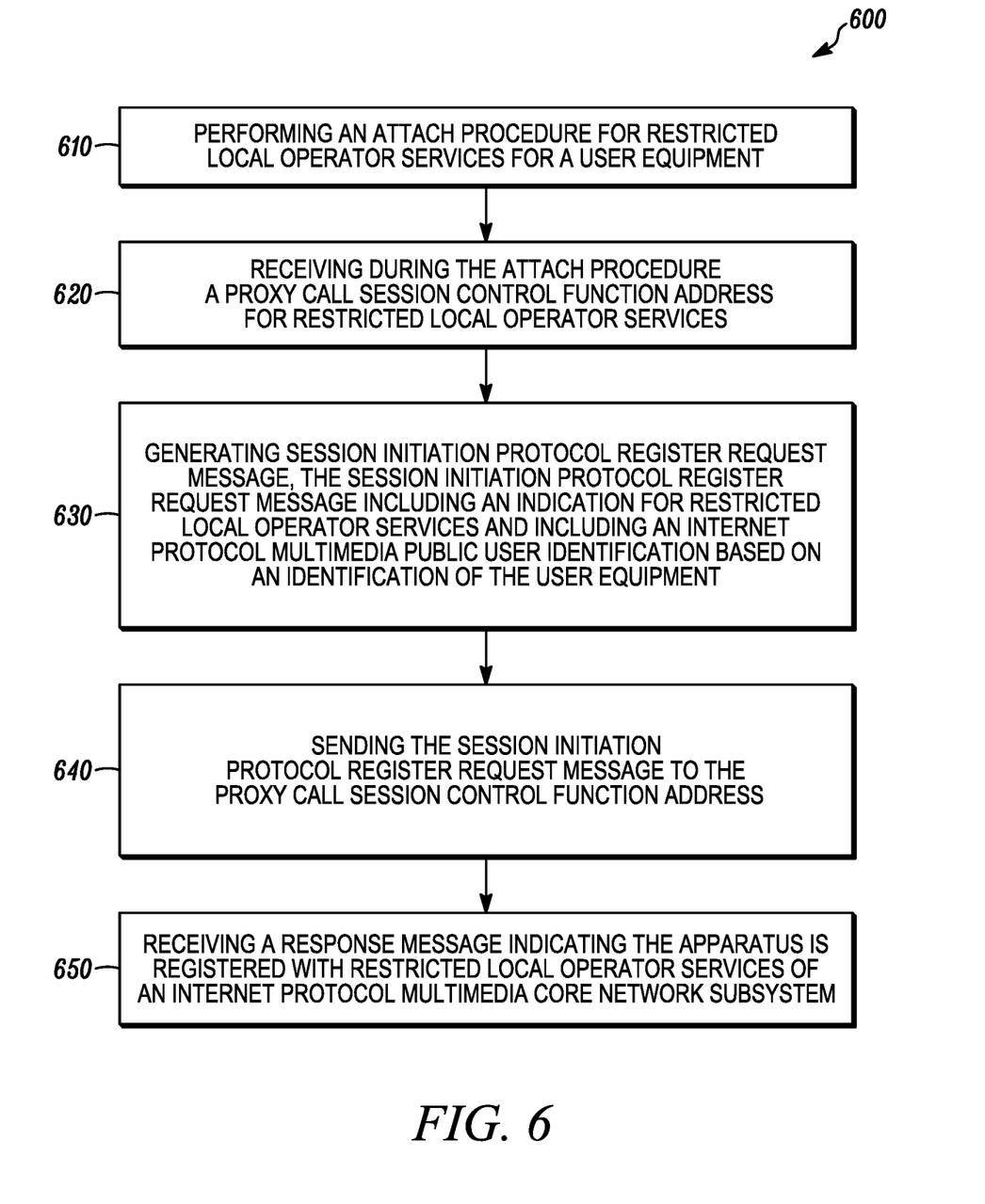
FIG. 6 is an example flowchart illustrating operation of an apparatus, such as a User Equipment (UE), according to a possible embodiment.

FIG. 6 is an example flowchart 600 illustrating operation of an apparatus, such as the UE 110, according to a possible embodiment. At 610, the Attach procedure can be performed for the RLOS for the apparatus.

At 620, the P-CSCF 142 address for the RLOS can be received during the Attach procedure. At 630, a SIP REGISTER request message can be generated. The SIP REGISTER request message can include an indication for the RLOS and the SIP REGISTER request message can include the IMPU based on an identification of the UE 110.

At 640, the SIP REGISTER request message can be sent to the P-CSCF address, the SIP REGISTER request message including the indication for the RLOS. At 650, a response message indicating the UE 110 is registered with the RLOS of the IMS 140 can be received.

According to a possible embodiment, a SIP INVITE request message can be sent to the network entity 120 based on an acceptance of the SIP REGISTER request message. According to a possible embodiment, the flowchart 600 can further include generating a Public Key for the apparatus and including the Public Key in the SIP REGISTER request message. According to a possible embodiment, for the flowchart 600 the identification of the apparatus can include at least one of an identification of the equipment of the apparatus associated with an Attach procedure for the apparatus and the IMPU. According to a possible embodiment, a validity time can be associated with the registered the RLOS of the IMS 140.

Figure 7:
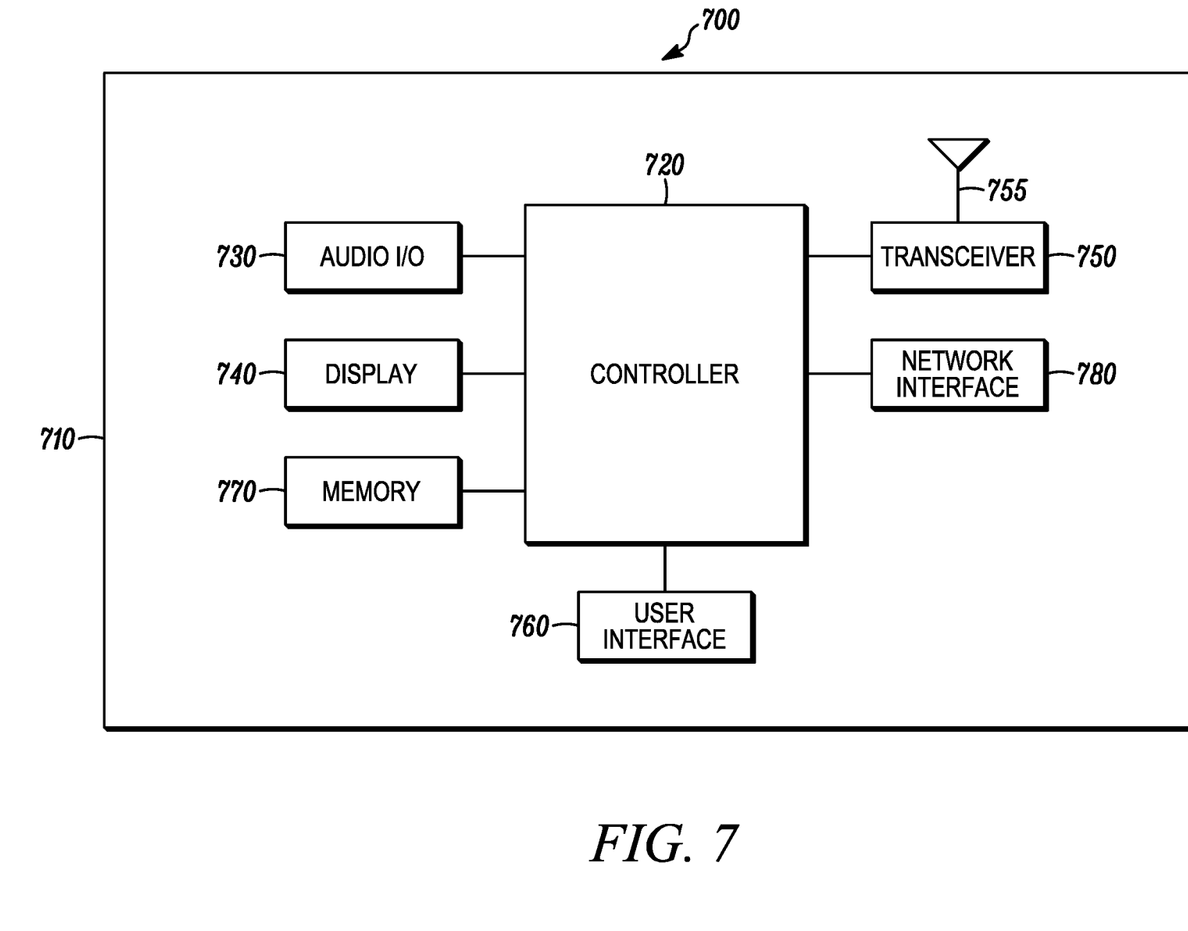
FIG. 7 is a block diagram of an example apparatus, according to a possible embodiment.

FIG. 7 is an example block diagram of an apparatus 700, such as the UE 110, the network entity 120, or any other wireless and non-wireless communication device disclosed herein, according to a possible embodiment. The apparatus 700 can include a housing 710, a controller 720 coupled to the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can perform the methods described in all the embodiments.

The display 740 can be a viewfinder, a liquid crystal display (LCD), a light emitting diode (LED) display, a plasma display, a projection display, a touch screen, or any other device that displays information. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 770 can include a random-access memory, a read only memory, an optical memory, a solid-state memory, a flash memory, a removable memory, a hard drive, a cache, or any other memory that can be coupled to an apparatus.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

In operation as the P-CSCF 142, the transceiver 750 can receive the SIP REGISTER request message from an apparatus, such as the UE 110 wherein the SIP REGISTER request message comprises an indication for the RLOS. According to a possible embodiment, the SIP REGISTER request message can include security material, such as the Public Key associated with the apparatus. According to a possible embodiment, the SIP REGISTER request message includes the IMPU, the IMPU including an ID associated with the apparatus and one of generated and received during an Attach procedure, and, if the IMPU is not suitable for the IMS, the controller 720 can combine the IMPU with a network domain derived from an address associated with the P-CSCF 142 for RLOS and received during the Attach procedure.

The controller 720 can detect the SIP REGISTER request message for the RLOS based on the RLOS indication. The transceiver 750 can forward the SIP REGISTER request message to the S-CSCF 144 in response to the detecting that the SIP REGISTER request message is for RLOS. The transceiver 750 can send a response message indicating the apparatus is registered with RLOS of the IMS 140.

According to a possible embodiment, the controller 720 can select the S-CSCF 144 based on the RLOS indication and in response to the detecting that the SIP REGISTER request message is for the RLOS. According to a possible embodiment, the controller 720 can generate a Public Key, wherein the response message that the apparatus, such as the apparatus, is registered with RLOS of the IMS 140 includes the generated Public Key. According to a possible embodiment, the controller 720 can perform service control for the registration of the RLOS of the IMS 140, the service control comprising at least one of adjusting a timer for the RLOS registration to a validity time and triggering when to initiate de-registration of the IMS 140. According to a possible embodiment, the transceiver 750 can establish an IMS session including the RLOS indication in a SIP INVITE request message.

In operation as the UE 110, the transceiver 750 can perform the Attach procedure for the RLOS for the UE 110. The transceiver 750 can receive the P-CSCF 142 address for RLOS during the Attach procedure. The controller 720 can generate an indication for RLOS and the SIP REGISTER request message includes the IMPU based on an identification of the UE 110. The transceiver 750 can send the SIP REGISTER request message to the P-CSCF address, the SIP REGISTER request message can include the indication for RLOS. The transceiver 750 can receive a response message indicating the UE 110 is registered with RLOS of the IMS 140.

According to a possible embodiment, the transceiver 750 can send a SIP INVITE request message to the network entity 120 based on an acceptance of the SIP REGISTER request message. According to a possible embodiment, the controller 720 can generate a Public key for the UE 110 and including the Public Key in the SIP REGISTER request message. According to a possible embodiment, the identification of the UE 110 can include at least one of an identification of the equipment of the UE 110 associated with an Attach procedure for the UE 110 and the IMPU. According to a possible embodiment, a validity time can be associated with the registered RLOS of the IMS 140.

The methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,"" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method, comprising:
    performing an attach procedure for restricted local operator services for an apparatus, wherein restricted local operator services comprise communication services provided by a wireless wide area network operator, involve at least one selected from automated or human customer service assistance, and are restricted to at least one selected from a captive portal and a particular dialed digit string;
    receiving during the attach procedure a proxy call session control function address for the restricted local operator services;
    generating session initiation protocol register request message, the session initiation protocol register request message including an indication for the restricted local operator services and including an internet protocol multimedia public user identification;
    sending the session initiation protocol register request message to the proxy call session control function address; and
    receiving a response message indicating the apparatus can use the restricted local operator services of an internet protocol multimedia core network subsystem.

2. The method according to claim 1, further comprising sending a session initiation protocol invite request message to a network entity based on an acceptance of the session initiation protocol register request message.

3. The method according to claim 1, further comprising:
    generating a public key for the apparatus;
    including the public key in the session initiation protocol register request message.

4. The method according to claim 1,
    wherein the internet protocol multimedia public user identification is based on an identification of the apparatus, and
    wherein the identification of the apparatus includes at least one of an identification of the equipment of the apparatus associated with an attach procedure for the apparatus and an internet protocol multimedia public user identification.

5. The method according to claim 1, wherein a validity time is associated with the registered restricted local operator services of the internet protocol multimedia core network subsystem.

6. The method according to claim 1, wherein the session initiation protocol requester request message includes an indication of security capabilities of the apparatus.

7. The method according to claim 1, wherein the response message includes a proxy call session control function key.

8. An apparatus, comprising:
    a transceiver that performs an attach procedure for restricted local operator services, wherein restricted local operator services comprise communication services provided by a wireless wide area network operator, involve at least one selected from automated or human customer service assistance, and are restricted to at least one selected from a captive portal or particular dialed digit strings, wherein the transceiver receives during the attach procedure a proxy call session control function address for the restricted local operator services; and a controller that generates a session initiation protocol register request message, the session initiation protocol register request message including an indication for the restricted local operator services and including an internet protocol multimedia public user, wherein the transceiver sends the session initiation protocol register request message to the proxy call session control function address, and wherein the transceiver receives a response message indicating the apparatus can use the restricted local operator services of an internet protocol multimedia core network subsystem.

9. The apparatus according to claim 8, wherein the transceiver further sends a session initiation protocol invite request message to a network entity based on an acceptance of the session initiation protocol register request message.

10. The apparatus according to claim 8, wherein the controller further generates a public key for the apparatus and includes the public key in the session initiation protocol register request message.

11. The apparatus according to claim 8, wherein the internet protocol multimedia public user identification is based on an identification of the apparatus, and wherein the identification of the apparatus includes at least one of an identification of the equipment of the apparatus associated with an attach procedure for the apparatus and an internet protocol multimedia public user identification.

12. The apparatus according to claim 8, wherein a validity time is associated with the registered the restricted local operator services of the internet protocol multimedia core network subsystem.

13. The apparatus according to claim 8, wherein the session initiation protocol requester request message includes an indication of security capabilities of the apparatus.

14. The apparatus according to claim 8, wherein the response message includes a proxy call session control function key.

15. The method according to claim 1, wherein an emergency call is an exception to restricted local operator services.

16. The apparatus according to claim 8, wherein an emergency call is an exception to restricted local operator services.

* * * * *